United States Patent [19]

Cohen et al.

[11] Patent Number: 5,132,102
[45] Date of Patent: Jul. 21, 1992

[54] METHOD FOR HEAT TREATMENT OF FINES WITH ATMOSPHERE CONTROL

[75] Inventors: Sidney M. Cohen, Allentown; William E. Lindquist, Schnecksville; Barry W. Diamond, Allentown, all of Pa.

[73] Assignee: Fuller Company, Bethlehem, Pa.

[21] Appl. No.: 454,466

[22] Filed: Dec. 21, 1989

[51] Int. Cl.⁵ ............................................. C01G 7/00
[52] U.S. Cl. .................................... 423/23; 423/47; 423/167; 423/460; 432/14
[58] Field of Search .................. 75/1, 9, 71, 26; 423/23, 47, 167, 460; 432/14, 106

[56] References Cited

U.S. PATENT DOCUMENTS

| | | | |
|---|---|---|---|
| 4,381,916 | 5/1983 | Warshawsky | 432/14 |
| 4,427,372 | 1/1984 | Takesue et al. | 432/14 |
| 4,483,831 | 11/1984 | Schmidt et al. | 432/14 |
| 4,592,900 | 6/1986 | Hundebol | 432/14 |
| 4,941,821 | 7/1990 | Durr et al. | 432/106 |
| 4,955,986 | 9/1990 | Maury et al. | 432/106 |

Primary Examiner—Melvyn J. Andrews
Attorney, Agent, or Firm—Daniel De Joseph

[57] ABSTRACT

A method to operate a flash calcination unit with both atmosphere and temperature control is described for mineral processing requirements and other atmosphere controlled processes. The method can be used to process phosphate, gold ore or activated carbon. The critical steps of the method involve an initial mixing of fine material combined with stoichiometric burning using at least one staged combustion furnace in a vertically oriented suspension calcination furnace. This effects control of oxygen or atmosphere in the combustion furnace with attendant control of temperature in that furnace.

13 Claims, 1 Drawing Sheet

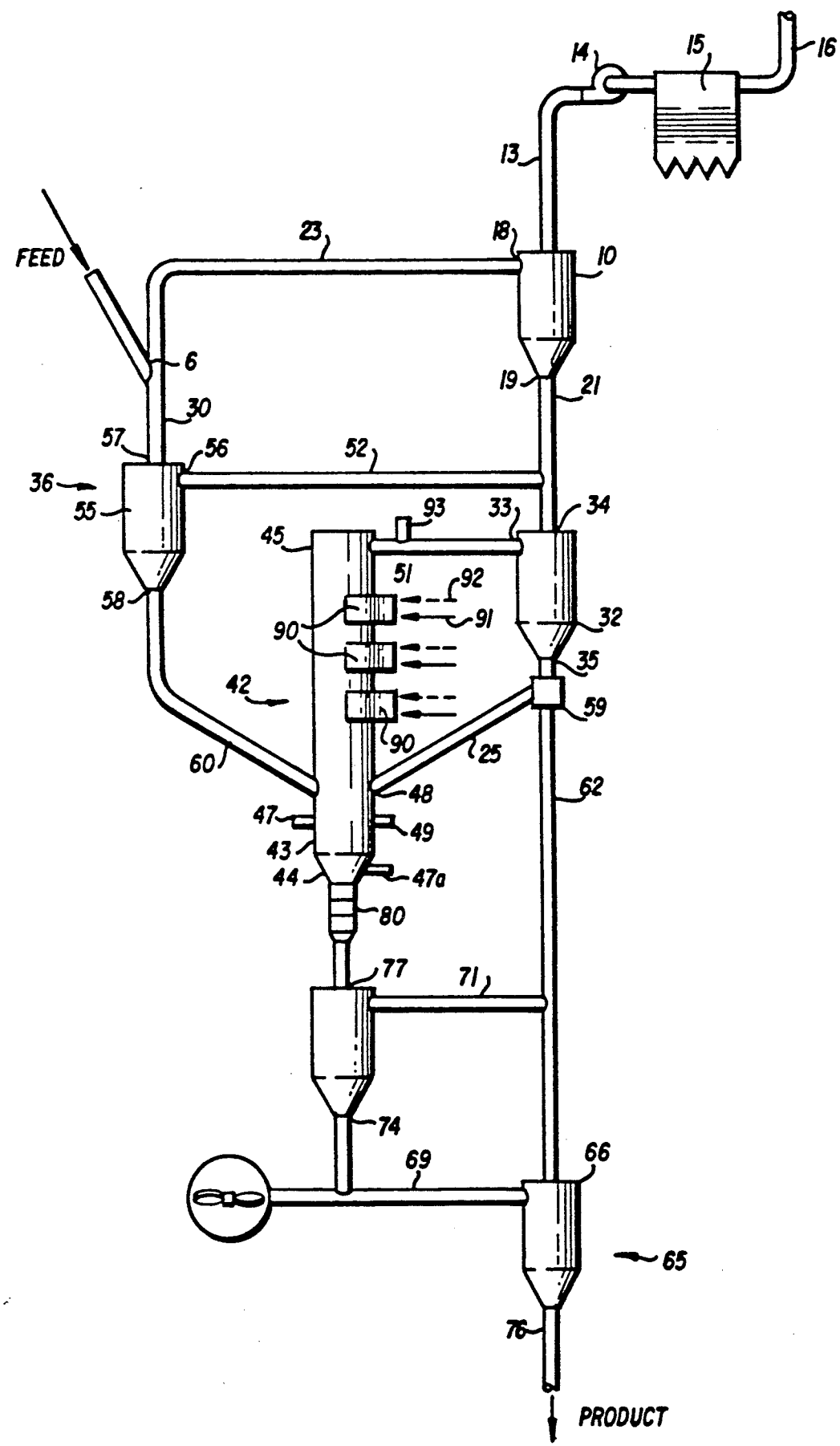

METHOD FOR HEAT TREATMENT OF FINES WITH ATMOSPHERE CONTROL

FIELD OF THE INVENTION

The invention relates to a method utilizing a flash calcination unit and gas reaction system. Typical uses include phosphate calcination and processing of ore or of activated carbon.

BACKGROUND OF THE INVENTION

This invention relates to a method for heat treatment of fine material using a flash calciner. The method specifically relates to phosphate calcination, as well as calcination of various ores. The present method can also be utilized to process fines generated from activated carbon rotary kiln systems.

Pyrometallurgical operations when applied to ores generally alter the chemical and physical properties of the materials processed. These known processes are characterized by chemistry which mainly involves gas-solid reactions such as calcination.

A basic pyrometallurgical operation is the decomposition of hydrates and carbonates. A typical reaction is the decomposition of pure limestone ($CaCO_3$) to calcium oxide and carbon dioxide:

$$CaCO_3(s) \rightarrow CaO(s) + CO_2(g)$$

where the symbols (s) and (g) represent the solid and gaseous state, respectively. This reaction is strongly endothermic, and in a conventional processing system requires high heat input and long retention times.

Lime is an important raw material for the metallurgical industry. It is used primarily as a flux in smelting and converting, but it is also a neutralizing agent for hydrometallurgical processes. The calcination of magnesite ($MgCO_3$) yields magnesia (MgO) which is an essential raw material for furnace refractories. The calcination of dolomite ($CaCO_3 \cdot MgCO_3$) also yields a calcine used as a feed for the preparation of magnesium metal, as well as other uses.

Other examples of similar process are phosphate calcination and gold ore processing.

The unique characteristics of flash calcination are particularly suited to processing phosphate. Phosphate is a complicated mineral, that varies from deposit to deposit with each ore requiring its own special processing considerations. When phosphate rock is processed to produce super-phosphates and phosphoric acid, thermal processing is required to remove carbon, sulfides and certain trace elements. In addition, there can also be some upgrading of the $P_2O_5$ content by the elimination of certain components such as lime. In processing, it's important not to destroy the delicate crystal structure of the phosphate by overheating. This is important because the porosity of the phosphate is very important in the digestion steps that follow calcination. Flash calcination offers the unique advantages of very short retention times, high heat transfer rates, very good oxygen contact and rapid cooling. All of these characteristics are very important in the production of high quality calcined phosphate.

Many gold ores contain sulfides and carbon, which result in high cyanide consumption in the recovery process. Heat treating the ore prior to the cyanide leach will reduce cyanide consumption, which is vital to the economics of processing. Processing in an oxidizing atmosphere where there is above average mixing of the ore with the gas is very important to the oxidizing roast. For the present invention, a properly sized ore when processed in the flash calciner is subjected to excellent dispersion and mixing in the gas stream. Oxygen and temperature can be controlled over the whole length of the calcining zone.

Applicants method achieves energy conservation by control of temperature and gas atmosphere of a flash calcination unit during a protracted residence time of the material being calcined.

The system of the present invention offers several advantages compared to the prior art. The system permits maximum gas to solid contact for reaction to take place. Excellent control is permitted. The present system also has high fuel efficiency as a result of heat recovery from solids and gases. Excellent temperature control is achieved for heat sensitive products and flame contact can be eliminated if desired. The present system can also eliminate reduction gas components internally ahead of the preheat system immediately after the reaction furnace using bleed air which eliminates the use of an external afterburner. With these advantages in mind, applicants will begin to describe in greater detail their discovery and achievements.

SUMMARY OF THE INVENTION

The invention relates to a method for heat treatment of fine material using a vertically oriented suspension calciner comprising:

a) preheating fine material;

b) injecting preheated material into a swirling gas flow in a suspension furnace;

c) controlling a mixture of fine material and gas in the suspension furnace to limit availability of oxygen in contact with the material while maintaining a desired gas temperature in the suspension furnace; and d) collecting a product.

This invention further relates to a method for heat treatment of fine material using an essentially vertical suspension calciner comprising:

a) preheating fine material;

b) injecting preheated material into a swirling gas flow effected by a stationary impeller in a suspension furnace; the suspension furnace containing at least one combustion furnace along the length of the suspension furnace to inject controlled quantities of fuel and oxygen to maintain a neutral or reducing atmosphere in the suspension furnace;

c) controlling a mixture of fine material and gas in the suspension furnace to limit availability of oxygen in contact with the material while maintaining a desired gas temperature in the suspension furnace by maintaining substantially stoichiometric burning in the combustion furnace; and d) collecting a product.

This invention also relates to a method to separate heavy metals and gaseous components during heat treatment of fine material using an essentially vertical suspension calciner comprising:

a) preheating fine material;

b) injecting preheated material into a swirling gas flow effected by a stationary impeller in a suspension furnace; the suspension furnace containing at least one combustion furnace along the length of the suspension furnace to inject controlled quantities of fuel and oxygen to maintain a neutral or reducing atmosphere in the suspension furnace;

c) controlling a mixture of fine material and gas in the suspension furnace to limit availability of oxygen in contact with the material while maintaining a desired gas temperature in the suspension furnace by maintaining substantially stoichiometric burning in the combustion furnace;

d) separating or vaporizing heavy metals or gaseous components; and e) collecting a product.

BRIEF DESCRIPTION OF THE DRAWING

The invention will be described in connection with annexed drawing which is not considered to limit the invention. The Figure is a diagramatic view of an apparatus used for carrying out the process of the present invention.

DETAILED DESCRIPTION OF THE INVENTION

The method of the present invention operates by controlling both atmosphere and temperature for mineral processing requirements and other atmosphere control processes. Some examples follow in which such control can be effected.

One example is phosphate calcination which involves reduction of sulfides and cadmium. Here, swirling combustion gas inlet would be controlled to remove carbonacious materials and some forms of sulfides by effecting an oxidizing atmosphere. Cadmium removal has been found to require reducing conditions as will some forms of sulfur minerals. Another example is gold ore processing. There, carbonacious material and sulfide contaminant which reacts with cyanide leach process requires roasting in a high oxygen atmosphere. This converts sulfide and reduces its interference with the cyanide leach process. Another example is activated carbon processing. This involves fines generated from activated carbon rotary kiln systems. The fines can be processed in this invention under reducing conditions to produce a usable product. The present method is adaptable to all other systems which require temperature and atmosphere control to separate or vaporize forms of heavy metals and gaseous components, such as sulfur.

An object of the present invention is to improve the economics of such processing while avoiding undesirable side reactions such as collapsing of phosphate crystals during phosphate calcination. This is achieved by controlling both temperature and atmosphere in an essentially vertical suspension furnace. The purpose of the control of the suspension furnace is to reduce the amount of oxygen available to either oxidize material or reduce material in the process. Ultimately, this results in lengthening the zone of the reaction so that a more uniform temperature in the reaction zone is achieved. This is done by the manner of injecting the fuel to have staged combustion along the length of the suspension furnace. While fuel is injected at the bottom of the suspension furnace in a conventional manner, that is, using primary (feed) and secondary (supplemental) air to burn that fuel, upper portions or stages in the suspension furnace are maintained so that temperature and atmosphere promote combustion on a stoichiometric basis. This neutral or reducing atmosphere produced by stoichiometric combustion is critical to the invention. Thus, the air that is required to burn the fuel is injected along with the fuel so that the upper portions or stages maximize the temperature without disturbing control of the atmosphere. This sophisticated technique prolongs the reaction and residence time in the suspension furnace so that desired temperature and atmosphere control can be achieved.

Atmosphere means that oxygen availability is controlled. This is achieved by a critical feature of the present invention which is the stoichiometric burning of fuel in combustion chambers. This is done by controlling oxygen or fuel to the combustion furnace. The method operates by essentially eliminating excess oxygen in the combustion process. Then a neutral atmosphere can be obtained in the suspension calcination furnace. Of course, a reducing atmosphere can be provided by providing insufficient oxygen so that excess fuel enters the suspension calcination furnace. This fuel depleats oxygen from the gas use to transport fine material. Manipulation of the reaction is used to control temperature. Thus, temperature and atmosphere can be controlled to effect superior particulate products economically. Optionally, oxygen can be injected during the processing of fine material. Fuel can be injected conventionally at the bottom of the suspension calcination furnace.

More particularly, atmosphere is controlled by using multiple burners and by using direct fired combustion chambers. Thus, in a vertical suspension furnace it is possible to overfuel with the lowest direct injection burner. The whole heat load does not have to be handled by this one burner because there are additional burners. Through use of combustion chamber burners above the initial burner, applicants achieve the advantage of adding additional heat and a controlled atmosphere. With the combustion chambers, total control over the fuel and air is achieved which permits control of the atmosphere. Heat is injected using the combustion chamber and therefore, the hot zone of the suspension furnace is lengthened. By stoichiometric burning or by adding some excess air for reducing atmosphere in the suspension furnace, the combustibles in the vessel can be burned or trimmed while even increasing temperature.

For an optional oxidizing atmosphere in the suspension furnace, heat can be added with the combustion chamber, excess air can be added or burning can occur with the deficiency of air to trim the oxygen in the suspension furnace. Bleed air can be added at the exhaust gas outlet to ensure complete combustion of the fuel.

To better understand the invention, it will now be described regarding to the apparatus shown in the drawing.

In conduit 6 and flash dryer 10, moist material is dried to a powder. The cyclone 10 includes an inlet 18 for gas and entrained solid material and an outlet for gas connected to the conduit 13 and an outlet 19 for dried material flow connected by conduit 21 to cyclone 32. Thus, the dryer 10 serves to carry out the process step of drying solid material while it is in suspension in hot spent preheater gases. Exhaust gas from the flash dryer 10 is supplied through conduit 13 and fan 14 to a high efficiency dust collector 15 such as a scrubber or fabric filter bag house with the cleaned air being supplied to a stack 16 for exhaust.

The dried material discharged from drier 10 through conduit 21 is entrained in hot gas flowing through conduit 23. Feed material is supplied to a conduit 30 where it is supplied to a cyclone 10 having an inlet 23 for gas and entrained material, an outlet 13 for gas and an outlet 21 for preheated material.

The cyclone 10 and 55 and the associated duct work 30, 23 and 52 constitute a preheater 36 for preheating the dried material while suspended in a stream of hot gas. It should be understood that the preheater may be a single stage cyclone or more than two stages may be used. Actually 1 to 4 stages of suspension preheat can be used depending on the operating temperature of the calciner. The higher the temperature, the greater the number of stages used to recover off-gas heat for fuel efficiency. The flow of material in the preheater is generally counter-current to the flow of hot gas. Thus, the preheater 36 includes an inlet (conduit 21) for dried material to be processed, an outlet 23 for spent preheating gas and an outlet 60 for preheated material.

The apparatus of the present invention includes a vertically oriented elongated suspension or calcining furnace generally indicated at 42 and defined by a vessel 43 having a lower end 44 and an upper end 45. The lower end 44 has a tangential inlet 47 for fuel, and an inlet 49 for air for combustion in the vessel 42 whereby combustion takes place. The lower end of the vessel also includes means or inlet 60 for supplying preheated material to be processed to the lower end of the vessel via an optional recycle conduit 25. This inlet is flow connected to the outlet 35 of the collection cyclone 32.

The upper end 45 of the vessel 43 has an outlet 51 (preferably tangential) for spent combustion gases and processed material so that the flow of combustion gases and entrained material is co-current from the lower end 44 of the vessel 43 to the upper end 45. While the preheated fine material is suspended in the hot combustion gases, it is calcined.

A gas-solids separator or collecting cyclone 32 has an inlet 33 for gas and entrained processed material, an outlet 34 for separated gas and an outlet 35 for processed solid material. The cyclone 32 is flow connected to cyclone 55 by conduit 52. The outlet 34 for gas is flow connected to the preheater 36 by duct 52 and this duct 52 defines the inlet for spent combustion gas of the preheater flow connected to the outlet 34 for spent combustion gas of the gas-solids separator 32.

A material cooler is generally indicated at 65 and is a device for cooling the material by suspending it in ambient air and is shown as a pair of serially connected cyclones 66 and 67 each having an inlet for gas and entrained material, an outlet for separated solids and an outlet for separated gas. Ambient air is supplied from atmosphere by means of a fan 68 through a conduit 69 to cyclone 66. A duct 71 interconnects the outlet for separated gas of cyclone 66 with the inlet for gas and entrained solids of cyclone 67. The solids outlet of cyclone 67 is connected to duct 74 to conduit 69. The cyclone 67 separated the product from the cooling gas and supplied it through an outlet 74 to conduit 69 where it is again entrained in the cooling gas further cooled and conveyed to cyclone 66. The cyclone 66 discharged product or processed material through outlet 76 and preheated cooling gas through conduit 71. The cyclone 67 discharges preheated air for combustion through an outlet 77 to the inlet 49 for air for combustion of the calciner furnace 42.

A mechanical spinner of any suitable type is provided at 80 for inducing and maintaining a helical or swirling motion to the air for combustion. This mixing step is critical to the invention. Those skilled in the art will know how to design such an apparatus for imparting a helical motion to the preheated air for combustion, but such a device may take the form of stationary helical vanes (not shown) on the inside of the duct, an impeller which is rotated by an external motor, or other suitable means such as a tangential inlet.

The process of the present invention also includes recirculating a portion of at least partially calcined material back to the calcining furnace 42. This process is carried out by providing a splitter valve 59 at the outlet 35 of cyclone 32 and a conduit 25 connecting cyclone 32 to the lower end 44 of the vessel 43. The splitter 59 controls the flow of material to either conduit 25 or conduit 62 with the usual practice being to supply part of the material to conduit 25 for recirculation to the calciner for further calcining and the balance of the material is discharged to cooler 65 through conduit 62. See generally U.S. Pat. No. 4,381,916, hereby incorporated by reference, for the recirculation of material in a flash calciner. Prior to the present invention, it is not believed that recirculation was even attempted with the fine materials, because such recirculation could result in overburning.

With the present invention, the preferred form of supplying thermal energy to the calcining furnace is in the form of direct injection of fuel to the lower part of the calcining furnace with material supplied through conduit 60 to the calciner above the fuel inlet 47. The preheated material will drop down near the flame generated by the fuel injection in lower cone 47a and is initially contacted by the high temperature associated with direct combustion within the calciner. While the inlet for preheated material is above the inlet for fuel, because of gravity flow, the preheated material may tend to drop through the flame generated by the injection of fuel within the calciner. This contact with the flame is believed to cause a prompt calcination of at least the surface of the material. The inner core of the material is processed by maintaining the calciner at the desired temperature so that the residence time of the material in the high temperature vessel completes the process. The inlet for the fuel and material may be tangential.

Additionally, thermal energy is supplied in the form of direct injection of small amounts of fuel to the vessel 43 at points intermediate the lower fuel inlet and the upper outlet 51. The injection may be tangential. It is desirable not to provide additional high temperature flame contact for the material to avoid overburning the surface of the material. Fuel is not directly injected into the vessel at the upper levels. External combustion chambers 90 are provided to supply additional thermal energy between the lower end 44 and upper end 45 of the calcining vessel. Both fuel as indicated by the solid line arrows 91 and air for combustion as indicated by the dotted lines 92 are supplied to each of the combustion chamber 90. Element 93 is an air bleed. The close coupled combustion chambers are mounted so that hot gases of combustion are injected into the calcining vessel 43 at vertically spaced apart points above the fuel inlet 47 and the material inlet 60 and 48 of the vessel 43. It has been found that it is important to maintain the helical flow of material through the vessel 43 which was initially established by the spinner 80. This is maintained by having the hot combustion air supplied to the calciner by substantially tangential inlets as illustrated. Preferably, these inlets may be at slight angles such as 20° to 30° to the tangential. The burner 47 should also be positioned tangentially or nearly so at 20° to 30° from tangential. This helical flow of hot gases prevents the material from sticking to the sides of the calcining furnace. Further, it has been found that with the helical flow and injection of hot combustion gases rather than the use of flame, that a product loss on ignition or LOI of between 1% and 2% can be maintained.

The use of external combustion chambers allows greater control over the quantity of thermal energy that can be supplied to the upper levels of the vessel compared to the direct injection of fuel into the vessel and makes it easier to maintain a uniform temperature throughout the vessel 42 thereby achieving more uniform calcining of the material as a whole. Thus, with separate combustion chambers, maximum thermal energy can be supplied by fuel inlet 47 and supplemental thermal energy supplied at the upper levels, but in some use it may be desirable to add the majority of the thermal energy at the upper levels. This configuration permits the necessary flexibility to achieve optimum operations.

With the present invention, it has been found desirable to maintain the temperature within the calciner approximately between 1600° F. and 1800° F. This also includes maintaining exit gas temperature at outlet 51 in the range of approximately 1650° to 1750° F. Product discharged from cyclone 55 will have a temperature between 1500° to 1700° F. and ideally approximately 1600° F. The temperature at gas outlet 34 will be on the order of 1100° to 1500° F. with a preferred range of 1300° to 1470° F. These temperatures are accomplished by maintaining combustion temperatures in the auxiliary combustion chambers 90 between 2000° F. to 2500° F. Thermalcouples (not shown) may be provided in each of the combustion chambers to provide for proper control of the temperature within the calcining furnace 42. It is to be understood that for thermal processing of ores, some other temperature may be appropriate and those skilled in the art will be able to achieve the desired temperature through routine experimentation. For example, processing temperature in the calciner for phosphate is between about 800° C. to about 1100° C. For gold ore, it is between 400° C. to about 600° C. For activated carbon, it is between about 1000° C. and about 1300° C.

Also, with the calcining of fine materials, it has been found that the oxygen content within the calcining furnace should be maintained approximately in the range of about 0.5 to 2% while the oxygen content in the duct 52 should be maintained between approximately 0.5 and approximately 1%.

The product temperature may be in the range of 200° to 450° F. and ideally between 250° to 350° F.

Feed material is generally −20 mesh of finer. Cold feed material enters into an off-gas stream via conduit 30 from preheater 55. Thus, the feed material is preheated while being conveyed to preheater 10 via conduit 23. With the temperature of the material increased, it drops down in preheater 10. The material is injected into heated gas and is separated from it. The gas becomes spent gas and exits to bag collector 15. The separated preheated material now drops into another duct 52 in second stage preheater 55 where it is preheated by the gas of preheater 55 to higher temperature. It is separated from that gas which goes on to preheat the first material as mentioned above. The material drops down from outlet 58 via conduit 60 to the flash calciner 43 into the processing zone. This zone contains temperature controls known in the art which facilitates maintaining the temperature at a desired processing temperature for the particular material being processed.

For example, a reducing atmosphere is required to process phosphate from which cadium is removed. Phosphate is injected into the zone which advantageously shortens retention time, thereby precluding overheating the phosphate and causing the crystal structure to collapse. However, a sufficiently high enough temperature is required to vaporize the cadmium while maintaining the proper atmosphere.

Fuel is injected at four different points in the flash calciner 43. The fuel is injected in a quantity to create a reducing atmosphere. As the material comes up the flash calciner from the lower end 44 to upper end 45, fuel is injected in the combustion chamber 90 to maintain temperature in the established reducing atmosphere. When the process material reaches the top 45 of the flash calciner, the cadmium has been separated from the phosphate. At this point, bleed air is added along with some excess reduction components. Bleed air is injected to eliminate components so that hydrocarbons are not emitted from the system. At this stage, a fully processed material is obtained.

The collector 32 separates the vaporized cadmium from the remainder of the material. Cadmium goes off with the off-gases. The processed phosphate drops down to a location such as at valve 59 where a portion can be recycled by passing it through conduit 25 to the bottom 44 of the flash calciner 43. The recirculation on the collection cyclone 32 discharged can be adjusted to obtain up to a 10 to 1 recycle rate to the furnace if additional retention time is required. Of course, the remainder of the product is passed via conduit 62 to cooling cooler 65 which cools the phosphate. The final product is recovered from conduit 76. The phosphate is cooled using air blown in through conduit 69.

Off gas from the cooler 66 are passed via conduit 71 to upper cooler 67. This heated off-gas enters beneath the swirling means or impeller 80. The impeller spins the gases immediately below the fuel injection point 47. For low temperature processing, fuel injection is not used and material is contacted with preheated cooler gases only with controlled atmosphere as required at the lower section of furnace 44. The material and swirling gases mix at the lower end 44 of the calciner 43. Above this point, multiple tangential gas fired combustion chambers 90 are spaced to supply hot gases with controlled atmosphere (reducing or highly oxidizing). They are placed to maintain the tangential flow started by the impeller

EXAMPLES

The invention will now be described by experimentation which is considered to be illustrative, but not limiting.

EXAMPLE 1

Five experiments were conducted in the treatment of phosphate as explained above. The operation followed the procedure set forth above. Operating conditions and results are described in the following table.

TABLE

PHOSPHATE/CALCINER RUN
PRIMARY OPERATING CONDITIONS AND RESULTS

| | Phase | | | | |
|---|---|---|---|---|---|
| | 1 | 2 | 3 | 4 | 5 |
| Time (Hrs.) | 1600–1655 | 0935–1130 | 1200–1330 | 1400–1625 | 1625–1700 |
| Phase Duration | 52 | 115 | 90 | 145 | 35 |
| Product Recirculation Ratio | 0 | 0 | 0 | 0 | 3:2 |
| Feed Rate (lbs/hr.) | 1197 | 1233 | 517 | 125 | 219 |
| Loss-Free Feed Rate (lbs/hr.) | 1133 | 1168 | 489 | 119 | 208 |
| Product Rate (lbs/hr.) | 1124 | 1110 | 467 | 93 | 182 |
| Baghouse Rate (lbs/hr.) | 32 | 25.5 | 25.5 | 25.5 | 25.5 |
| Chemical Analysis (Cadmium) | | | | | |
| PPM in Product | 44 | 32 | 18.5 | 15 | 12.2 |
| PPM in Baghouse | 169 | 340 | 485 | 425 | — |
| PPM in Feed | 57 | 57 | 57 | 57 | 57 |
| Gas Analysis | | | | | |
| Collection Cyclone Inlet $O_2$ (%) | 0.25 | 0.56 | 0.20 | 0.20 | 1.2 |
| Collection Cyclone Inlet Combustibles (%) | 1.9 | 0.7 | 0.7 | 0.8 | 0.1 |
| Temperatures | | | | | |
| Combustion Chamber Exit Temp. (°C.) | 700 | 710 | 703 | 725 | 730 |
| Avg. Burning Zone Temp. (°C.) | 873 | 1002 | 1096 | 1199 | 1180 |
| Collection Cyclone Inlet Temp. (°C.) | 900 | 980 | 1100 | 1163 | 1160 |
| Collection Cyclone Exit Temp. (°C.) | 850 | 918 | 1010 | 1053 | 1065 |
| Collection Cyclone Discharge Temp. (°C.) | 890 | 955 | 1023 | 1045 | 1060 |
| Preheat Cyclone Inlet Temp. (°C.) | 385 | 445 | 470 | 550 | 540 |
| Preheat Cyclone Inlet Temp (°C.) | 305 | 355 | 383 | 458 | 450 |
| Fuel | | | | | |
| Combustion Chamber #2 Fuel Oil (GPH) | 4.99 | 5.42 | 5.11 | 5.32 | 5.35 |
| Lower Duct Burner #2 Fuel Oil (GPH) | 7.5 | 9.3 | 9.9 | 6.5 | 8.6 |
| Middle Duct Burner #2 Fuel Oil (GPH) | 2.42 | 2.67 | 1.74 | 3.63 | 3.18 |
| Upper Duct Burner #2 Fuel Oil (GPH) | 1.31 | 4.51 | 5.17 | 3.28 | 2.33 |
| Airflow | | | | | |
| Total Airflow to Flash Calciner (SCFM) | 384 | 384 | 384 | 384 | 384 |
| lb/Material/lb. Air | 0.65 | 0.64 | 0.27 | 0.05 | 0.11 |
| BTU/lb. Product | 1876 | 3565 | 6102 | 26182 | 12163 |

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

We claim:

1. A method for heat treatment of fine material using a vertically oriented suspension calciner comprising:
   a. preheating fine material;
   b. injecting said preheated fine material into a swirling gas flow effected by a stationary impeller in a suspension furnace to thereby form a mixture of fine material and oxygen-containing gas;
   c. controlling a mixture of fine material and gas in the suspension furnace to limit availability of oxygen in contact with the material while maintaining a desired gas temperature in the suspension furnace; and
   d. collecting a product.

2. The method according to claim 1, wherein the gas is air.

3. The method according to claim 1, wherein the fine material is phosphate, gold ore or activated carbon.

4. The method according to claim 1, further comprising collecting the product in a cyclone.

5. The method according to claim 1, wherein the preheated material is tangentially injected into the suspension furnace.

6. The method according to claim 1, wherein the swirling gas flow rises in an essentially vertical direction in a suspension furnace.

7. The method according to claim 1, wherein the suspension furnace contains at least one combustion furnace along the length of the suspension furnace to inject controlled quantities of fuel and oxygen to maintain a desired atmosphere in the suspension furnace.

8. The method according to claim 7, wherein the product from the combustion furnace is injected tangentially.

9. The method according to claim 7, wherein the combustion furnace maintains substantially stoichiometric burning.

10. The method according to claim 1, wherein the atmosphere in the suspension furnace is an oxidizing atmosphere.

11. The method according to claim 1, wherein the atmosphere in the suspension furnace is a reducing atmosphere.

12. A method for heat treatment of fine material using an essentially vertical suspension calciner comprising:
 a) preheating fine material;
 b) injecting preheated material into a swirling gas flow effected by a stationary impeller in a suspension furnace; the suspension furnace containing at least one combustion furnace along the length of the suspension furnace to inject controlled quantities of fuel and oxygen to maintain a neutral or reducing atmosphere in the suspension furnace;
 c) controlling a mixture of fine material and gas in the suspension furnace to limit availability of oxygen in contact with the material while maintaining a desired gas temperature in the suspension furnace by maintaining substantially stoichiometric burning in the combustion furnace; and
 d) collecting a product.

13. A method to separate heavy metals and gaseous components during heat treatment of fine material using an essentially vertical suspension calciner comprising:
 a) preheating fine material;
 b) injecting preheated material into a swirling gas flow effected by a stationary impeller in a suspension furnace; the suspension furnace containing at least one combustion furnace along the length of the suspension furnace to inject controlled quantities of fuel and oxygen to maintain a neutral or reducing atmosphere in the suspension furnace;
 c) controlling a mixture of fine material and gas in the suspension furnace to limit availability of oxygen in contact with the material while maintaining a desired gas temperature in the suspension furnace by maintaining substantially stoichiometric burning in the combustion furnace;
 d) separating or vaporizing heavy metals or gaseous components; and
 e) collecting a product.

* * * * *